United States Patent [19]
Jeon

[11] Patent Number: 5,521,829
[45] Date of Patent: May 28, 1996

[54] PATH TRACING APPARATUS FOR A ROBOT

[75] Inventor: Jae W. Jeon, Suwon, Rep. of Korea

[73] Assignee: Samsung Electronics Co., Ltd., Suwon, Rep. of Korea

[21] Appl. No.: 109,595

[22] Filed: Aug. 20, 1993

[30]     Foreign Application Priority Data

Aug. 28, 1992 [KR] Rep. of Korea .................. 92-15586

[51] Int. Cl.$^6$ .................................................. G06F 19/00
[52] U.S. Cl. .................. 364/474.03; 364/474.19; 364/474.37; 364/474.26
[58] Field of Search ............. 364/167.01, 184–186, 364/474.03, 474.24, 474.26, 474.16, 474.18, 474.22, 474.25, 474.28, 474.13, 474.37; 318/578

[56]     References Cited

U.S. PATENT DOCUMENTS

| 4,678,976 | 7/1987 | Inoue | 364/184 |
| 4,914,364 | 4/1990 | Hirai | 364/474.29 |

Primary Examiner—Roy N. Envall, Jr.
Assistant Examiner—Thomas E. Brown
Attorney, Agent, or Firm—Burns, Doane, Swecker & Mathis

[57]     ABSTRACT

The invention provides a path tracing apparatus in which a microcomputer is connected to a robot controller and digitizer. A displayer shows the actual path of the digitizer and the intended path which is loaded in advance in the microcomputer. The path tracing apparatus for a robot can conveniently compare the actual path of the robot with the intended path by utilizing the microcomputer and the digitizer and it can measure precisely the accuracy of the actual path being traced by the robot as compared to the intended path.

2 Claims, 3 Drawing Sheets

PATH TRACING APPARATUS FOR A ROBOT

BACKGROUND OF THE INVENTION

The invention relates to a path tracing apparatus for a robot, and in particular, to a path tracing apparatus for a robot which compares the actual path traced with the intended preset path.

A conventional path tracing apparatus employs a tracing method in which an intended path which is drawn on paper in advance is compared with an actual path which is duplicated on paper by a standard pen attached to the robot.

A conventional path tracing apparatus is illustrated in FIG. 1, which comprises a robot controller 20, a robot 30 which receives control data from the robot controller 20 for moving the robot 30, a standard pen 90 which is connected to the end ejector of the robot 30 and which is moved by the robot 30 so as to inscribe the path on paper 100.

In the above apparatus, the standard pen 90 is employed by the robot 30 to inscribe a path on paper 100. However, there is a problem due to the difficulty of producing an accurate copy of the path due to variations in the size of the penpoint and the quality of the paper.

Further, there is a problem in that an error evaluation comparing the intended path to be duplicated on the paper 100 with the actual path inscribed by the robot 30 must be measured by an additional measuring instrument. Also, because the intended path to be inscribed on paper is different in each kind of robot, the intended path for each kind of robot must be prepared in advance by being inscribed on paper.

Furthermore, another problem is that whenever the robot 30 repeats a move on the same track, the paper may need to be replaced with new paper to measure the deviation caused by the movement of the robot.

SUMMARY OF THE INVENTION

The object of the present invention is to provide a path tracing apparatus for a robot which efficiently compares the actual path of the robot with the intended path by utilizing a microcomputer and a digitizer, and which precisely measures the accuracy of the path traced by the robot.

Another object of the present invention is to provide a path tracing apparatus for a robot which measures the velocity and the acceleration of the path inscription of the robot by utilizing the measurement data that is received from the digitizer.

Another object of the present invention is to provide a path tracing apparatus for a robot in which a robot controller is interconnected with a microcomputer and the coordinate data for the intended path to be duplicated by the robot is conveniently supplied to the robot by means of the digitizer and the microcomputer.

According to the present invention, the path tracing apparatus comprises a microcomputer and a robot controller which receives coordinate data of the intended features from the microcomputer and converts the data into control data to be duplicated.

The path trace apparatus further comprises a robot which is operated in response to the control data supplied by the robot controller and a digitizer pen which is connected to the robot and is moved by the operation of the robot.

The path tracing apparatus further comprises a digitizer which converts the analogue data of the actual path being duplicated by the pen into digital data, the digital data being supplied to the microcomputer and a display means which displays both the actual path and the intended path in accordance with the digital data for the actual path from the digitizer and the digital data for the intended path which is loaded into the microcomputer in advance.

BRIEF DESCRIPTION OF THE DRAWINGS

The invention will now be explained with reference to the accompanying drawings in which.

DESCRIPTION OF THE PREFERRED EMBODIMENTS

Figure 1:
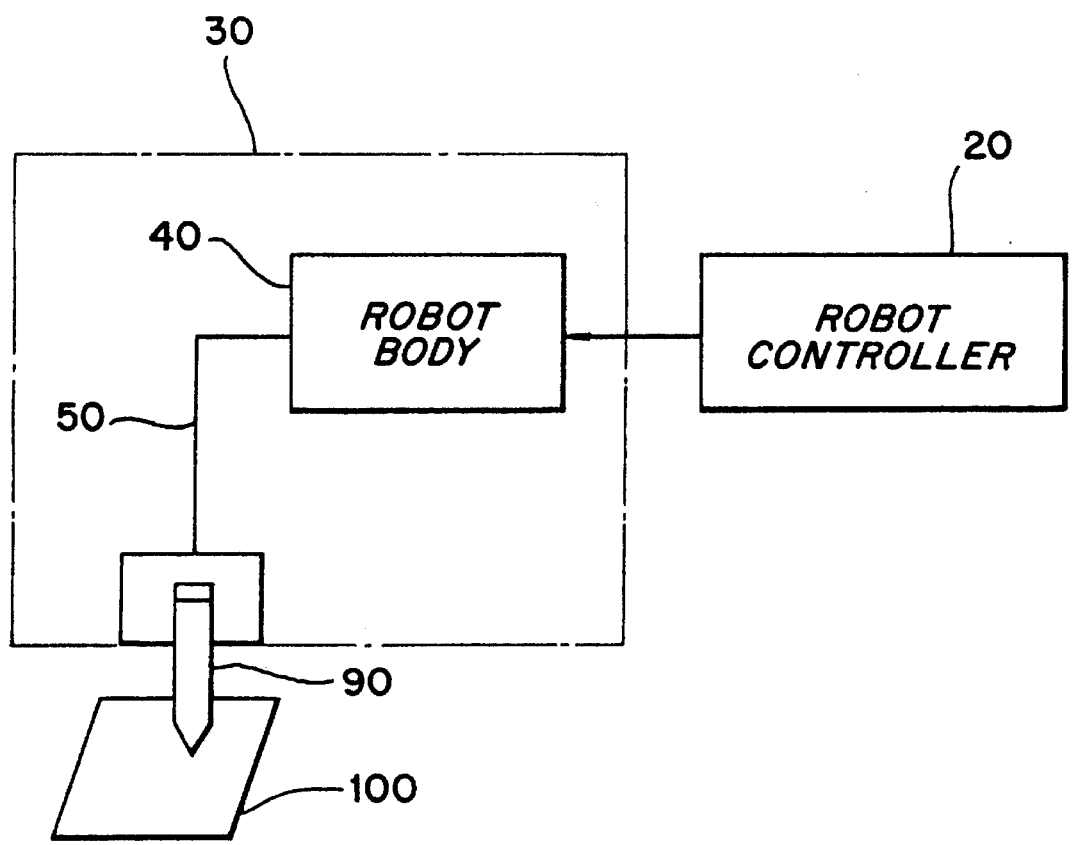
FIG. 1 is a block diagram of a path tracing apparatus for a robot according to the prior art.
Figure 2:
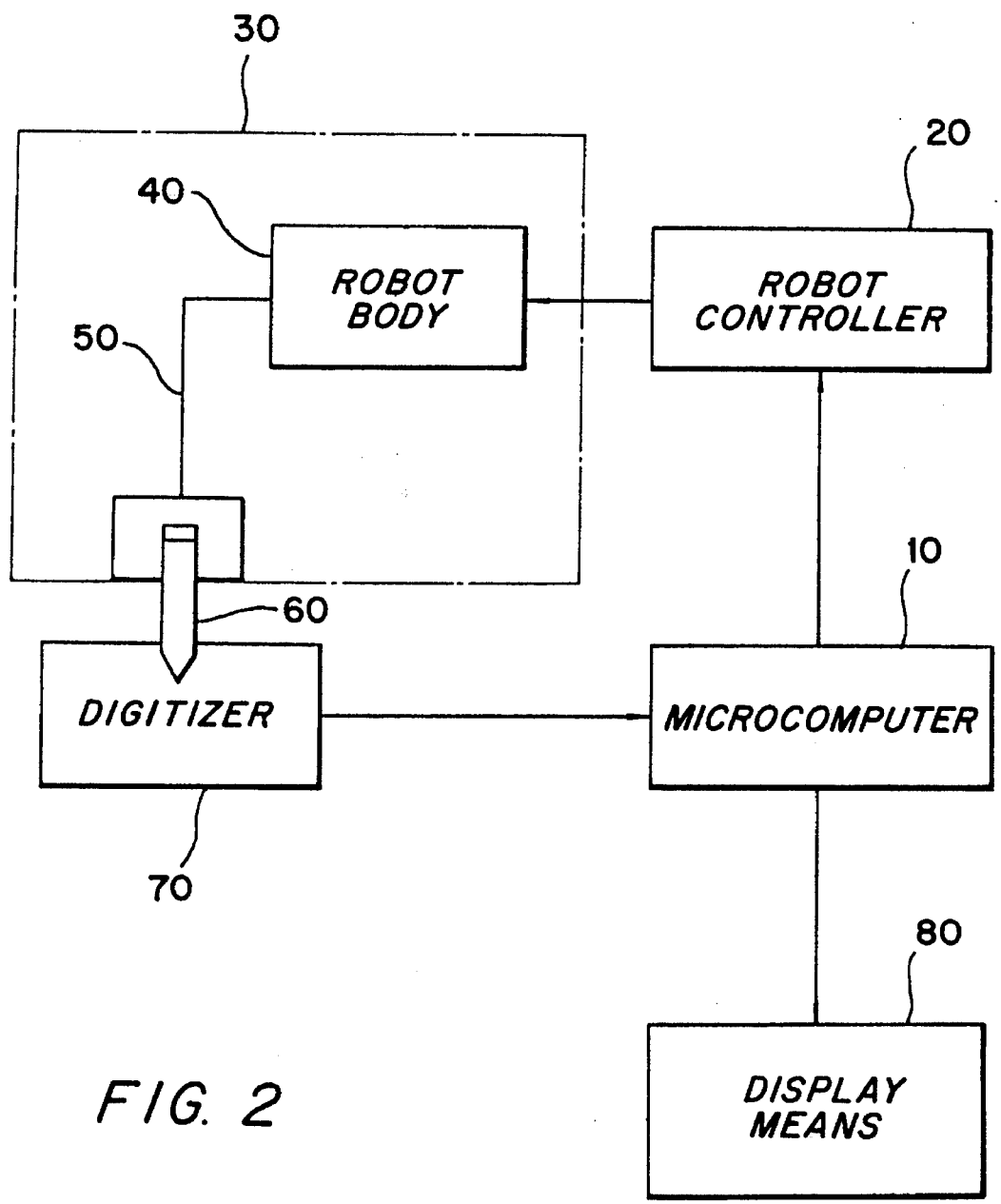
FIG. 2 is a block diagram of a path tracing apparatus for a robot according to the present invention.
Figure 3:
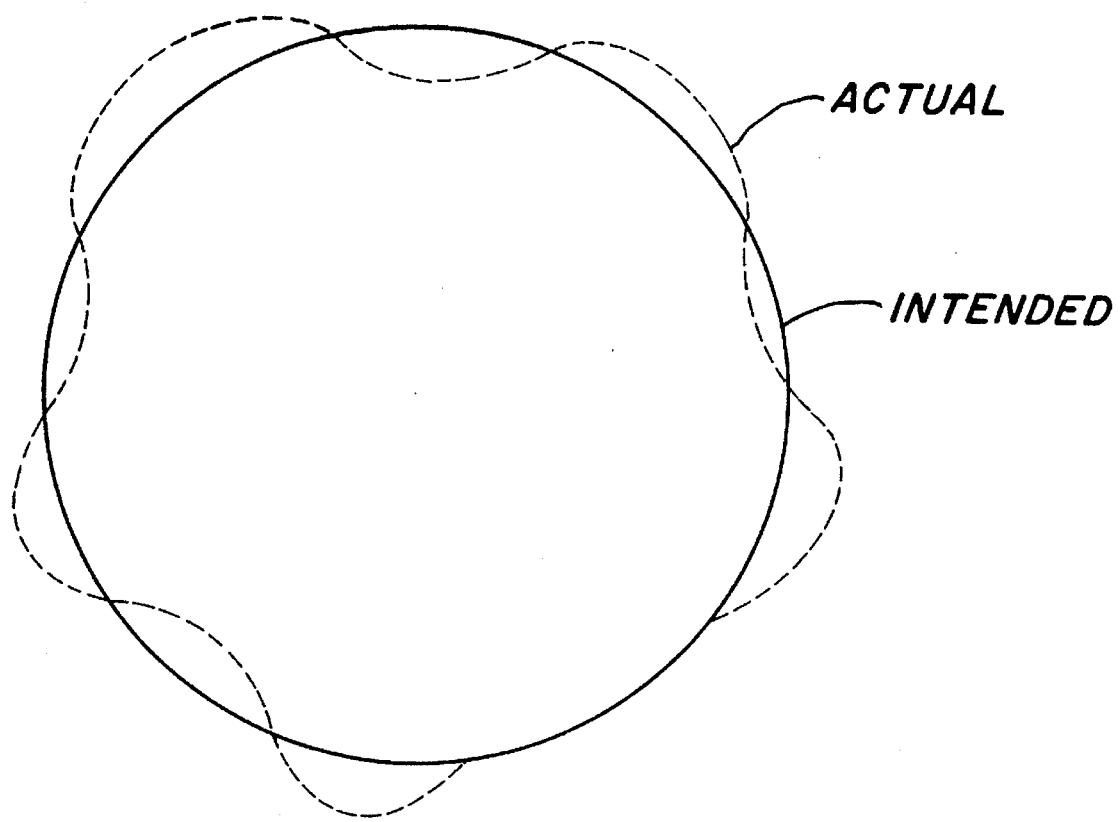
FIG. 3 is a diagram of a path executed by the apparatus according to the present invention.

FIG. 2 represents the block diagram of a path tracing apparatus for a robot according to the present invention and FIG. 3 is a diagram of a path executed by the apparatus according to the present invention.

A microcomputer 10 controls the entire execution for the path tracing apparatus for the robot and determines the variation value by receiving the path data from a digitizer 70 described below. A robot controller 20 receives coordinate data of the intended path from the microcomputer 10 and converts the coordinate data into the control data of the intended path to be duplicated.

Further, a robot 30 receives the control data of the intended path from the robot controller 20 and duplicates the path in accordance with the control data. The robot 30 comprises a robot body 40 which receives control data from the robot controller 20 and transmits the command data to execute the operation. Further, the robot 30 comprises a robot arm 50 which is operated in accordance with the command data transmitted from the robot body 40.

A digitizer pen 60 is interconnected to the robot arm 50 and is moved by the robot 30. A digitizer 70 receives the analogue data of the path of the robot 30 and converts the analogue data into digital data which is then delivered to the microcomputer 10.

Furthermore, a display means 80 displays variations between the actual path and the intended path. Any error is detected by comparing the digital data from the digitizer 70 with the intended path data of the robot 30 which is stored in advance in the microcomputer 10.

When the microcomputer 10 is supplied with power, the microcomputer 10 applies coordinate data of the intended path to the robot controller 20. The robot controller 20 converts the intended path data received from the microcomputer 10 into the control data for the intended path to be duplicated.

The control data from the robot controller 20 is transmitted to the robot body 40 of the robot 30. The robot body 40 then begins execution in accordance with the control data and it transmits an operative command to the robot arm 50. The robot arm 50 with the digitizer pen 60 is moved pursuant to the data received from the robot body 40 and then the pen 60 duplicates the actual path on the digitizer 70.

The digitizer 70 receives analogue data for the actual path so as to convert it into digital data and it applies the digital data to the microcomputer 10. First, the microcomputer 10 transmits the digital data which is represented by path "Intended" (FIG. 3) which is stored in advance in the microcomputer 10 to the means 80. The microcomputer 10 then transmits the digital data which is represented by path "Actual" (FIG. 3) of the robot arm 50 from the digitizer 70 to the display means 80.

Further, the display means 80 exhibits the above described path to clearly show the operator any variations between the intended path and the actual path. Furthermore, the digital data for the actual path of the robot can utilize the basic data which can measure the velocity and the acceleration for the actual path of the robot.

Thus, according to the above-described apparatus; the path tracing apparatus conveniently compares the actual path with the intended path by utilizing the microcomputer and the digitizer. Any error in the accuracy of the continuous path of the robot can be precisely measured. Furthermore, the velocity and the acceleration of the actual path of the robot can be calculated by utilizing the data from the digitizer.

What is claimed:

1. A path tracing apparatus for a robot comprising:

a microcomputer for storing coordinate data representing an intended path, said microcomputer comparing digital data representing actual data of a robot from a digitizer with the intended data and measuring a deviation between the actual path and the intended path, said microcomputer thereby calculating velocity and acceleration of the actual path of said robot;

a robot means comprising:
        a robot controller for receiving the coordinate data from said microcomputer and converting the coordinate data into control data to be inscribed, and
        said robot for tracing the intended path in accordance with the control data;

a digitizer pen, connected to said robot, which is moved by said robot according to the actual path;

said digitizer for converting analog data of the actual path along which said pen is moved into digital data and transmitting the digital data to said microcomputer; and a display means for displaying both the actual path and the intended path in accordance with the digital data for the actual path from said digitizer and the digital data of the intended path loaded into said microcomputer in advance.

2. The path tracing apparatus according to claim 1, wherein said robot comprises a robot body which receives control data which is supplied by said controller so as to generate operations command data and a robot arm which moves in accordance with the operations command data supplied by said robot body.

* * * * *